Nov. 4, 1958 | J. J. SURAN | 2,859,360

WAVE GENERATOR

Filed Dec. 12, 1955

INVENTOR:
JEROME J. SURAN,
BY George B. Eltgroth
HIS ATTORNEY.

United States Patent Office 2,859,360

Patented Nov. 4, 1958

2,859,360

WAVE GENERATOR

Jerome J. Suran, Syracuse, N. Y., assignor to General Electric Company, a corporation of New York Application December 12, 1955, Serial No. 552,641

4 Claims. (Cl. 307—88.5)

This invention relates to wave generating apparatus and more particularly, to an improved saw-tooth wave generator.

In the generation of saw-tooth waves, a frequently employed technique is the periodic discharge and charge of a capacitor. One of these charges occurs slowly, while the other occurs as rapidly as conveniently possible. Numerous generators of this type have been previously discussed, and one of particular interest in connection with the present invention is the saw-tooth wave generator shown at page 469 in "Principles of Transistor Circuits," edited by R. F. Shea and published in 1953 by John Wiley and Sons, Inc., of New York. In practice, it has been found that the wave shape appearing across the capacitor in such networks deviates considerably from the linear ideal. This is due in part to the well known effect of decreasing capacitor charging current with diminishing net charging voltage and in part to the irregular nature of the voltage current characteristic often encountered in the junction electrode of the double base diodes. While the recognized method of improving the saw-tooth linearity during the gradual portion of the operating cycle is to increase the charging supply voltage and the current limiting resistance, there are many applications where the supply voltage cannot be conveniently increased and it is yet desired to develop a saw-tooth wave whose amplitude is substantially more than 10 percent of that supply voltage.

Accordingly, it is a principal object of the invention to provide a saw-tooth wave generating network characterized by improved linearity of the gradual portion of the saw-tooth cycle.

Another object of the invention is to provide a new and improved technique for securing constant charging current in a saw-tooth wave generator.

The above and other objects and advantages of the invention are achieved by interposing a semiconductor diode in the capacitor charge circuit of a saw-tooth wave generator with a polarity such that the back resistance is presented during the gradual changes in amplitude of the saw-tooth wave, whereby a substantially constant current is available for modifying the capacitor charge.

While the novel and distinctive features of the invention are particularly pointed out in the appended claims, a more expository treatment of the invention, in principle and detail, together with additional objects and advantages thereof, is afforded by the following description and accompanying drawing of a representative embodiment in which:

Figure 1:
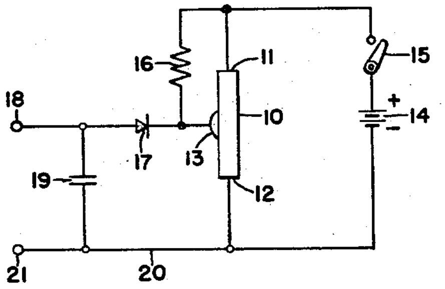
Figure 1 is a schematic illustration of a network according to the principles of the invention.

Referring now in greater detail to Figure 1, there is shown the semiconductor body 10 provided with an ohmic electrode 11 and ohmic electrode 12. Intermediately disposed on the body 10 is a junction region or electrode 13. Such a semiconductor assembly has been identified in the work of Shea earlier referred to as a double base diode and may be conveniently produced by using any of the now well known techniques for affixing ohmic and junction electrodes to bodies of semiconductor material such as germanium or silicon. In practice, a diffused alloy junction of indium on a body of n-type germanium has been found satisfactory. For further discussion of such devices reference is made to the said work of Shea and to the earlier filed applications of V. P. Mathis, Sawtooth wave generator, Serial Number 341,011, and of I. A. Lesk, Non-Linear Resistance Device, Serial Number 341,164, now U. S. Patent 2,769,926, both filed March 9, 1953 and both of which are assigned to the assignee of the present invention. While the device has been illustrated as a simple bar with ohmic electrodes at either end and an intermediate junction, it will be understood that in practice other physical configuration of the body 10 may be used and the ohmic electrodes may be on the same or opposite sides, or any combination thereof, in relation to the junction 13. It is desirable, however, that the separation between the junction 13 and the ohmic electrode 12 be less than the diffusion distance for minority carriers in the semiconductor body.

A source of potential 14 may be connected through switch 15 between ohmic electrodes 11, 12, either directly as shown, or through suitable impedances. In addition to its connection to the ohmic electrode 11, the positive pole of the source 14 is connected through a resistance 16 with the junction electrode 13. A semiconductor diode 17 has one electrode connected with the junction electrode 13 and its other electrode connected with the output terminal 18.

The poling of the diode 17 is such that its direction of easy flow is in agreement with the direction of easy flow from the junction 13 to the body of the semiconductor device 10. A capacitor 19 is connected between the lead to the semiconductor device 17 which is remote from the junction 13, and the line 20 which leads to the ohmic electrode 12. A terminal 21 connected with the line 20 provides the other point of connection for the output circuit. While the semiconductor diode 17 may be of the point contact type, it is preferable to employ a junction diode in this position, as will be seen, because the junction back current tends to be more constant over a wider range of impressed potentials. The magnitude of resistance 16 is selected to make it appreciably smaller than the back resistance between the junction 13 at the body of the semiconductor 10.

When the switch 15 is closed, a potential gradient is established along the body 10, which raises the portion adjacent the junction 13 to a potential positive with respect to that junction. This is true because the capacitor 19 was in a discharged condition when the switch 15 was closed, so that the connecting lead to the junction 13 is, instantaneously, at the potential of the ohmic electrode 12. Current flow to the line between the junction 13 and the diode 17 now occurs predominantly through resistance 16, which has been selected, as above noted, to present a considerably lower resistance than the back resistance between the junction 13 and the semiconducting body 10. Current flow through the resistance 16 develops a potential across the diode 17 which is in opposition to the polarity of easy flow, so that the current flowing through this diode is essentially limited to that arising from thermally generated hole-electron pairs This current flow is practically independent of applied voltage over a wide range, and accordingly the current flow which charges the capacitor 19 is substantially constant, and continues so despite the diminishing difference between the potential of capacitor 19 and the potential of the source 14. As the capacitor 19 charges, its potential ultimately rises sufficiently to make a portion of the junction 13 positive with respect to the adjacent portions of the semiconductor body 10, whereupon holes are injected into the body of the semiconductor device 10 and diffuse toward the ohmic electrode 12. This so alters the potential distribution within the body 10 that more and more of the area of the junction 13 is biased in its direction of easy flow, increasing rapidly the number of injected holes. The current so flowing rises rapidly to large magnitudes, since the direction of easy flow through the diode 17 is such as to offer little resistance to the discharge of the capacitor 19, which discharge now continues until injected charge carriers are eliminated more rapidly by recombination, drift, or diffusion than they are created, at which time the slow process of recharging begins. The cycle is then repeated until hte switch 15 is opened. The voltage waveform resulting from the periodic charge and discharge of capacitor 19 may be derived from the output terminals 18, 21, connected thereacross.

Figure 2:
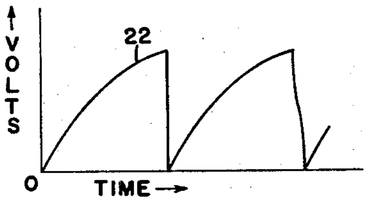
Figure 2 illustrates the voltage waves observed in saw-tooth wave generators in the prior art.

In the absence of the diode 17, the charging current flowing to the capacitor 19 is dependent upon the difference between the potential at capacitor 19 and the potential of the source 14 and so decreases steadily. Since the rate of change of potential across a capacitor is a linear function of the current flowing thereto, it is apparent that the slope of the voltage wave across capactor 19, in the absence of diode 17, diminishes steadily, as shown by the waveform 22 in Figure 2, where the abscissa represents elapsed time and the ordinates represent the potential which appears across the capacitor 19 in the absence of a diode 17.

Figure 3:
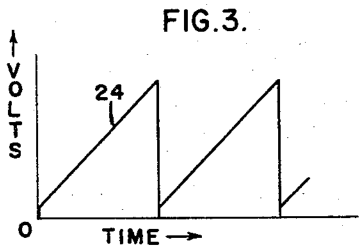
Figure 3 illustrates graphically the voltage wave developed by the saw-tooth wave generator described herein.

With the diode 17 present, the waveform is made linear as it appears at 24 in Figure 3. This linearization arises from the fact that the interposed diode 17 permits current flow therethrough only at the rate which is fixed by the thermal generation of hole-electron pairs. The constant charging current applied to the capacitor 19 produces a potential which is changing at a constant rate, and therefore the output waveform is characterized by constant slope and is a true saw-tooth.

While the principles of the invention have now been made clear in an illustrative embodiment, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What I claim as new and desire to secure by Letters Patent of the United States is:

1. In a saw-tooth wave generator, a semiconductor body provided with spaced ohmic electrodes and a junction electrode disposed in a region affected by an electric potential between said ohmic electrodes, an electric potential source connected between said ohmic electrodes, a semiconductor diode having one electrode connected with said junction electrode and poled with its direction of easy flow in agreement with the direction of easy flow at said junction electrode, a capacitor having one electrode connected with the other electrode of said semiconductor diode, means connecting the second electrode of said capacitor with the circuit including said ohmic electrodes externally of said semiconductor body, and means for deriving signals from said capacitor.

2. In a saw-tooth wave generator, a semiconductor body provided with spaced ohmic electrodes and a junction electrode disposed in a region affected by an electric potential between said ohmic electrodes, an electric potential source connected between said ohmic electrodes, a semiconductor diode having one electrode connected with said junction electrode and poled with its direction of easy flow in agreement with the direction of easy flow at said junction electrode, a capacitor having one electrode connected with the other electrode of said semiconductor diode, a resistance connecting said junction electrode with a first region of the circuit including said ohmic electrodes externally of said semiconductor body, means connecting the second electrode of said capacitor with a second region of the circuit including said ohmic electrodes externally of said semiconductor body, and means for deriving signals from said capacitor.

3. In a saw-tooth wave generator, a semiconductor body provided with spaced ohmic electrodes and a junction electrode disposed in a region affected by an electric potential between said ohmic electrodes, a D. C. potential source connected across said ohmic electrodes said source having a positive terminal connected to one of said ohmic electrodes and a negative terminal connected to the other of said ohmic electrodes, a semiconductor diode having one electrode connected with said junction electrode and poled with its direction of easy flow in agreement with the direction of easy flow at said junction electrode, a capacitor having one electrode connected with the other electrode of said semiconductor diode, a resistance connecting said junction electrode with said one ohmic electrode, the other electrode of said capacitor being connected to said other ohmic electrode, and means for deriving signals from said capacitor.

4. In a saw-tooth oscillator, an active multiterminal device having a first, a second and a third electrode, said device exhibiting a negative resistance characteristic over a predetermined potential range across said first and said second electrodes, an electric potential source, a capacitor adapted to be periodically charged from said potential source and discharged through said device, a circuit for providing charging current to said capacitor comprising said capacitor, a semiconductor diode and a resistance coupled in series in the order recited across said potential source, said semiconductor diode being poled in the direction opposed to said charging current and operating in a region of substantially constant current flow while providing said charge current, means coupling said first and second electrodes across the series combination of said semiconductor diode and said capacitor, and means coupling a potential source across said first and third electrodes.

References Cited in the file of this patent

UNITED STATES PATENTS 2,663,800 Herzog ---------------- Dec. 22, 1953

FOREIGN PATENTS 162,108 Australia -------------- Dec. 10, 1953
164,469 Australia -------------- May 6, 1954

OTHER REFERENCES

Electronics, March 1955, pages 199–202, "Diode Applications" by J. J. Suran.

Proceedings of the IRE, July 1955, vol. 43, No. 7, pages 814–820, "A Semiconductor Diode Multivibrator" by J. J. Suran.